US008892272B1

(12) United States Patent
Wooding

(10) Patent No.: US 8,892,272 B1
(45) Date of Patent: Nov. 18, 2014

(54) CHAUFFEUR FUNCTION THUMBPRINT LOCK AND IGNITION SYSTEMS

(71) Applicant: David Wooding, Glendale, AZ (US)

(72) Inventor: David Wooding, Glendale, AZ (US)

(*) Notice: Subject to any disclaimer, the term of this patent is extended or adjusted under 35 U.S.C. 154(b) by 0 days.

(21) Appl. No.: 13/962,780

(22) Filed: Aug. 8, 2013

(51) Int. Cl.
| | |
|---|---|
| G05D 1/00 | (2006.01) |
| B60R 25/25 | (2013.01) |
| B60R 25/20 | (2013.01) |
| B60R 25/24 | (2013.01) |
| G07C 5/00 | (2006.01) |
| F02N 11/08 | (2006.01) |

(52) U.S. Cl.
CPC ............. *B60R 25/252* (2013.01); *B60R 25/209* (2013.01); *B60R 25/24* (2013.01); *G07C 5/008* (2013.01); *F02N 11/0807* (2013.01)
USPC ............... 701/2; 705/325; 340/5.52; 382/115

(58) Field of Classification Search
CPC ...... G07C 5/008; B60R 25/24; F02N 11/0807
USPC ............... 701/2; 705/325; 340/5.52; 382/115
See application file for complete search history.

(56) References Cited

U.S. PATENT DOCUMENTS

| | | | |
|---|---|---|---|
| 5,686,765 A | 11/1997 | Washington | |
| 6,100,811 A | 8/2000 | Hsu et al. | |
| 6,111,977 A * | 8/2000 | Scott et al. | 382/124 |
| 6,614,920 B2 * | 9/2003 | Floyd | 382/124 |
| 6,927,668 B1 | 8/2005 | Odle et al. | |
| 6,980,672 B2 * | 12/2005 | Saito et al. | 382/124 |
| 2002/0034321 A1 * | 3/2002 | Saito et al. | 382/124 |
| 2002/0059523 A1 * | 5/2002 | Bacchiaz et al. | 713/200 |
| 2002/0097145 A1 * | 7/2002 | Tumey et al. | 340/426 |
| 2004/0233046 A1 * | 11/2004 | Gotfried et al. | 340/426.1 |
| 2005/0162260 A1 * | 7/2005 | Gupte et al. | 340/426.18 |
| 2006/0186987 A1 * | 8/2006 | Wilkins | 340/5.53 |
| 2006/0270454 A1 * | 11/2006 | Gotfried et al. | 455/558 |
| 2006/0293892 A1 * | 12/2006 | Pathuel | 704/246 |
| 2007/0197261 A1 * | 8/2007 | Humbel | 455/558 |
| 2009/0079539 A1 * | 3/2009 | Johnson | 340/5.83 |
| 2010/0060412 A1 * | 3/2010 | Johnson | 340/5.53 |
| 2010/0109838 A1 * | 5/2010 | Fisher | 340/5.72 |
| 2013/0096733 A1 * | 4/2013 | Manotas, Jr. | 701/2 |
| 2014/0162598 A1 * | 6/2014 | Villa-Real | 455/411 |

FOREIGN PATENT DOCUMENTS

JP    10-287209    * 10/1998    ............. B60R 25/04

OTHER PUBLICATIONS

English Machine Translation of JP10-287209 published Oct. 1998.*

* cited by examiner

*Primary Examiner* — Calvin Cheung

(57) ABSTRACT

A vehicle thumbprint door-lock and ignition access system is a fingerprint recognition system used in conjunction with automobile locks and automatic door openers. A thumbprint scanner compares a thumbprint with a stored database of thumbprints for a match. When a match is found, the vehicle door unlocks and is automatically opened to the fully opened position where it returns to manual operation. A second scanner, the ignition thumb-pad, then searches for an image match of the entered thumbprint on the ignition thumb-pad for a match and starts the engine if found. The ignition thumb-pad has a master-door-opener-interface with a five button keypad for automatically opening any combination of doors on the car, or all may be opened simultaneously. A key fob with five buttons is able to remotely access the master-door-opener-interface for door opening operation.

19 Claims, 5 Drawing Sheets

US 8,892,272 B1

CHAUFFEUR FUNCTION THUMBPRINT LOCK AND IGNITION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of fingerprint identification systems, and more specifically relates to fingerprint identification system specially designed for motor vehicles that allows keyless, automated access and to start the vehicle.

DESCRIPTION OF THE RELATED ART

Since nearly the inception of the internal combustion engine vehicle, it was apparent that access needed to be limited to the owner of the vehicle to protect his investment, and for safety reasons. As a result, the keyed ignition switch, and later the keyed vehicle door locks were invented and are still in use today. Keys for these locks have become more elaborate in recent years, incorporating computer chips into the keys for added security because of the need to reduce auto theft. Conventional keys are easily copied and locksmith or mechanical savvy individuals are able to gain unauthorized access to vehicles. Theft rings have proliferated in recent times that specialize in defeating the conventional door lock and keyed ignition switches for theft of vehicles. Vehicle theft is a major portion of caseloads for police departments across the country, as well as in other countries. A second problem is the amount of unauthorized use of motor vehicles from the vehicle owner's own family. Keys are generally left lying around in a vehicle owner's house, which often prove to be too tempting for underage family members or friends. It is difficult and inconvenient for a vehicle owner to carry a ring full of keys all the time when a home, but that inconvenience leads to a category of underage driver fatalities of its own.

A third problem is the loss of keys. Every vehicle owner has lost his or her keys at least once. Most owners have lost them several times during their driving years, and some habitually lose their keys. The problem is that keys are a separate device from the human body that the individual must keep track of. When attempting to open a car door while holding numerous other items, besides keys, dexterity and coordination become a challenge. Seldom is a second person available to open the door for the driver it seems. Technology moves forward in nearly every aspect of modern life, but this area lags behind. An advancement with respect to this is needed.

Various attempts have been made to solve the above-mentioned problems such as those found in U.S. Pat. Nos. 6,100, 811; 6,927,668; and 5,686,765. This art is representative of fingerprint identification devices. None of the above inventions and patents, taken either singly or in combination, is seen to describe the invention as claimed.

Ideally, a fingerprint identification device should require identification and provide convenience, and yet, would operate reliably, safely and be manufactured at a modest expense. Thus, a need exists for a reliable vehicle thumbprint door-lock and ignition access system to identify authorized users and unlock and open vehicle doors, and to avoid the above-mentioned problems.

BRIEF SUMMARY OF THE INVENTION

In view of the foregoing disadvantages inherent in the known fingerprint identification art, the present invention provides a novel vehicle thumbprint door-lock and ignition access system. The general purpose of the present invention, which will be described subsequently in greater detail, is to identify authorized users and unlock and open vehicle doors. Upon matched identification the vehicle may be started and driven.

A vehicle thumbprint door-lock and ignition access system is disclosed herein, in a preferred embodiment, comprising a thumbprint access assembly having at least one door thumb-pad with a door unlock activation circuit and a door opener activation circuit having at least one electric door opener, an ignition thumb-pad having an ignition-interface-circuit and a master-door-opener-interface, a central processing unit having a memory storage device, and a wireless keychain fob having an ignition-interface-circuit activator and a master-door-opener-interface activator.

The door thumb-pads are in communication with the central processing unit such that the central processing unit compares an imprinted-thumbprint on the imprinted door thumb-pad with the memory-stored-authorized-thumbprints stored in the memory storage device for a match. The memory storage device is preferably located within the central processing unit. The central processing unit is in communication with the door unlock activation circuit and the door opener activation circuit such that the door unlock activation circuit unlocks at least one vehicle door and the door opener activation circuit opens at least one vehicle door via an electric door opener(s) when the central processing unit matches the imprinted-thumbprint with a memory-stored-authorized-thumbprint. The electric door opener(s) may further comprise a 12 volt direct current motor which may be located at each door. The electric door opener disengages when the vehicle door reaches a fully opened position and returns to manual operation.

The ignition thumb-pad is in communication with the central processing unit and the ignition-interface-circuit such that the vehicle motor is started when the central processing unit matches the imprinted-thumbprint with a memory-stored-authorized-thumbprint. The master-door-opener-interface is located on the ignition thumb-pad and at least one vehicle door is opened when a door-button is pressed on the master-door-opener-interface. An ignition-interface-circuit activator is located on the wireless keychain fob and is able to communicate wirelessly with the ignition-interface-circuit such that the engine of the vehicle is started when a start button of the ignition-interface-circuit activator is pressed. A master-door-opener-interface activator is also located on the wireless keychain fob and is able to communicate wirelessly with the door unlock activation circuit and the master-door-opener-interface such that at least one vehicle door is unlocked and is opened when at least one, or any combination of door buttons on the master-door-opener-interface activator is pressed. The thumbprint access assembly is useful for limiting vehicle entry and the starting of the vehicle motor to an authorized user-driver, and for keylessly unlocking and opening the vehicle door(s) for hands-free convenience.

A key and a keyed ignition switch are able to be used alternately with the ignition thumb-pad and are able to override the ignition thumb-pad, and a door key and a keyed door-lock are able to be used alternately with the door thumb-pads and are able to override the door thumb-pad. The master-door-opener-interface of the ignition thumb-pad is able to selectively unlock and to open a first door, a second door, a third door, and/or a fourth door, or all doors at once, of the vehicle. The wireless keychain fob is also able to selectively unlock and to open the first door, the second door, the third door, and/or the fourth door of the vehicle, or all doors at once.

The memory storage device is able to store a plurality of images of memory-stored-authorized-thumbprints. The ignition thumb-pad is a human machine interface (HMI) such that the user-driver is able to remove or add additional memory-stored-authorized-thumbprints into the memory storage device using a 5 digit numeric code entered on the master-door-opener-interface of the ignition thumb-pad. The door thumb-pads and the ignition thumb-pad are preferably optical scanning keypads. The thumbprint access assembly may further comprise an analog-to-digital converter for storing the memory-stored-authorized-thumbprint in digital format. The thumbprint access assembly may comprise a trunk-lid thumb-pad in alternate embodiments in addition to the door and ignition thumb-pads. In yet another embodiment, an engine-hood thumb-pad may be utilized in addition to the door, ignition, and trunk thumb-pads. The thumbprint access assembly may be installed OEM on new vehicles during the initial manufacturing process but may also be retrofit-installed on older vehicles using a kit.

The vehicle thumbprint door-lock and ignition access system may comprise a kit having at least one door thumb-pad with a door unlock activation circuit and a door opener activation circuit, at least one electric door opener, an ignition thumb-pad having an ignition-interface-circuit and a master-door-opener-interface, a central processing unit having a memory storage device, a wireless keychain fob having an ignition-interface-circuit activator and a master-door-opener-interface activator, and at least one set of user installation instructions.

A method of use for a vehicle thumbprint door-lock and ignition access system is also disclosed herein and may comprise the steps of imprinting a user-driver thumbprint on a door thumb-pad to unlock and to open the vehicle door, pressing at least one door-button on a master-door-opener-interface on an ignition thumb-pad to open at least one additional vehicle door, imprinting a user-driver thumbprint on an ignition thumb-pad to start the engine of the vehicle, driving the vehicle from a first location to a second location, and activating an engine-shut-off switch to turn off the engine.

The present invention holds significant improvements and serves as a vehicle thumbprint door-lock and ignition access system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, vehicle thumbprint door-lock and ignition access system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a fingerprint identification system, and more particularly to a vehicle thumbprint door-lock and ignition access system as used to identify authorized users and unlock and open vehicle doors.

Generally speaking, the vehicle thumbprint door-lock and ignition access system is a fingerprint recognition system used in conjunction with automobile locks and automatic door openers. A thumbprint scanner compares a thumbprint with a stored database of thumbprints for a match. When a match is found, the vehicle door unlocks and is automatically opened to the fully opened position where it returns to manual operation. A second scanner, the ignition thumb-pad, then searches for an image match of the entered thumbprint on the ignition thumb-pad for a match and starts the engine when found. The ignition thumb-pad has a master-door-opener-interface with a five button keypad for automatically opening any combination of doors on the car, or all may be opened simultaneously. A key fob with (preferably) five buttons is able to remotely access the master-door-opener-interface for door opening operation.

Figure 1:
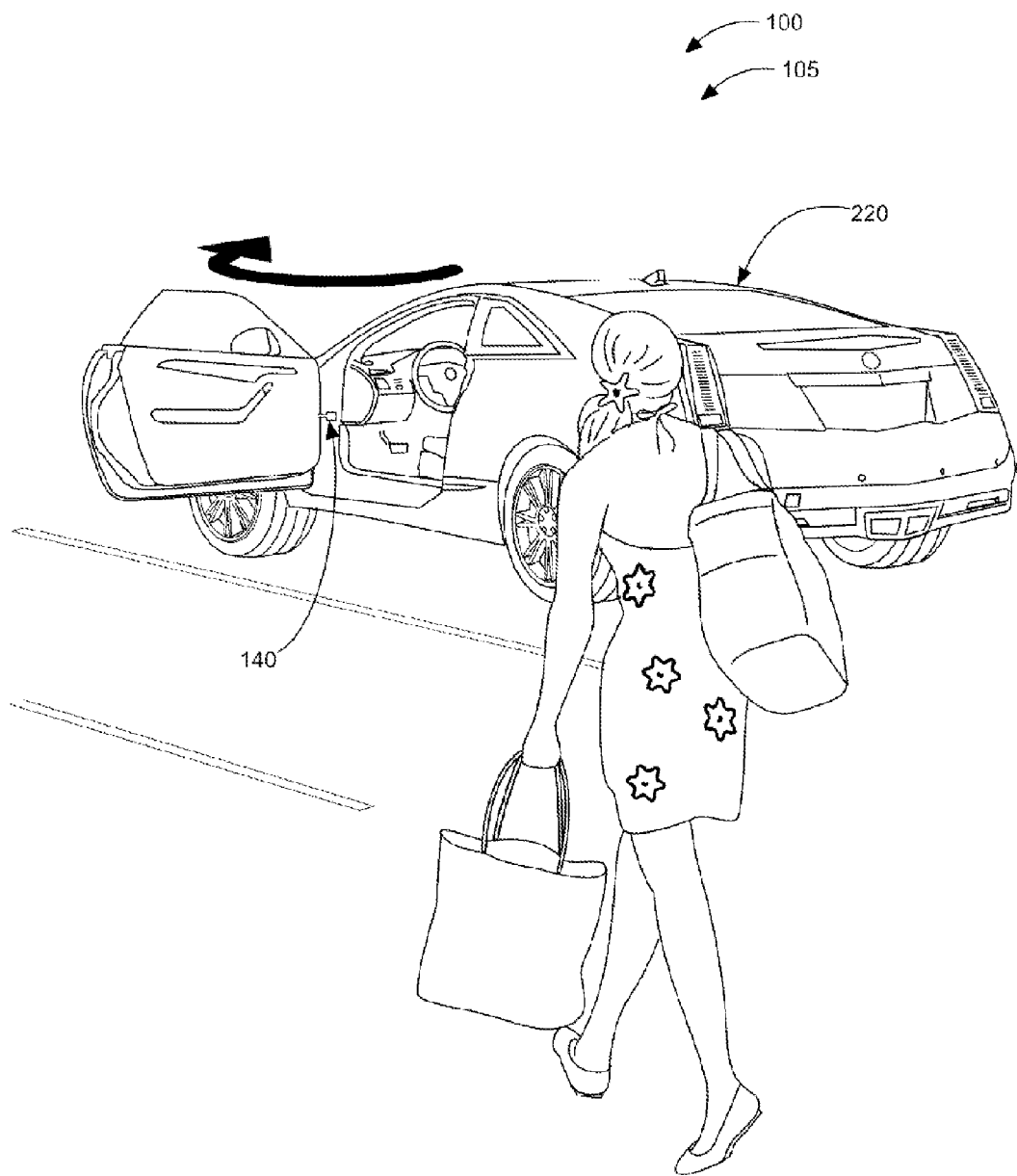
FIG. 1 shows a perspective view illustrating an in-use condition of a vehicle thumbprint door-lock and ignition access system according to an embodiment of the present invention.

Referring now to the drawings by numerals of reference there is shown in FIG. 1, a perspective view illustrating an in-use condition of vehicle thumbprint door-lock and ignition access system 100 according to an embodiment of the present invention.

Vehicle thumbprint door-lock and ignition access system 100 may comprise thumbprint access assembly 105 having at least one door thumb-pad 110 with door unlock activation circuit 120 and door opener activation circuit 130 having at least one electric door opener 140, ignition thumb-pad 150 having an ignition-interface-circuit 160 and master-door-opener-interface 170, central processing unit 180 (having memory storage device 190), and wireless keychain fob 199 having ignition-interface-circuit activator 200 and master-door-opener-interface activator 210.

Ignition-interface-circuit activator 200 is preferably located on wireless keychain fob 199 and is able to communicate wirelessly with ignition-interface-circuit 160 such that the engine of vehicle 220 is started when start button 230 of ignition-interface-circuit activator 200 is pressed. Master-door-opener-interface activator 210 is also located on wireless keychain fob 199 and is able to communicate wirelessly with door unlock activation circuit 120 and master-door-opener-interface 170 such that at least one vehicle door 240 is unlocked and is opened when at least one, or any combination of door buttons 250 on master-door-opener-interface activator 210 is pressed. Thumbprint access assembly 105 may comprise a trunk-lid thumb-pad in alternate embodiments in addition to door thumb-pad 110 and ignition thumb-pads 150. In yet another embodiment, an engine-hood thumb-pad may be utilized in addition to door thumb-pad 110, ignition thumb-pad 150, and a trunk thumb-pad. The thumbprint access assembly may be installed OEM on new vehicles during the initial manufacturing process but may also be retrofit-installed on older vehicles using a kit 450.

Figure 2:
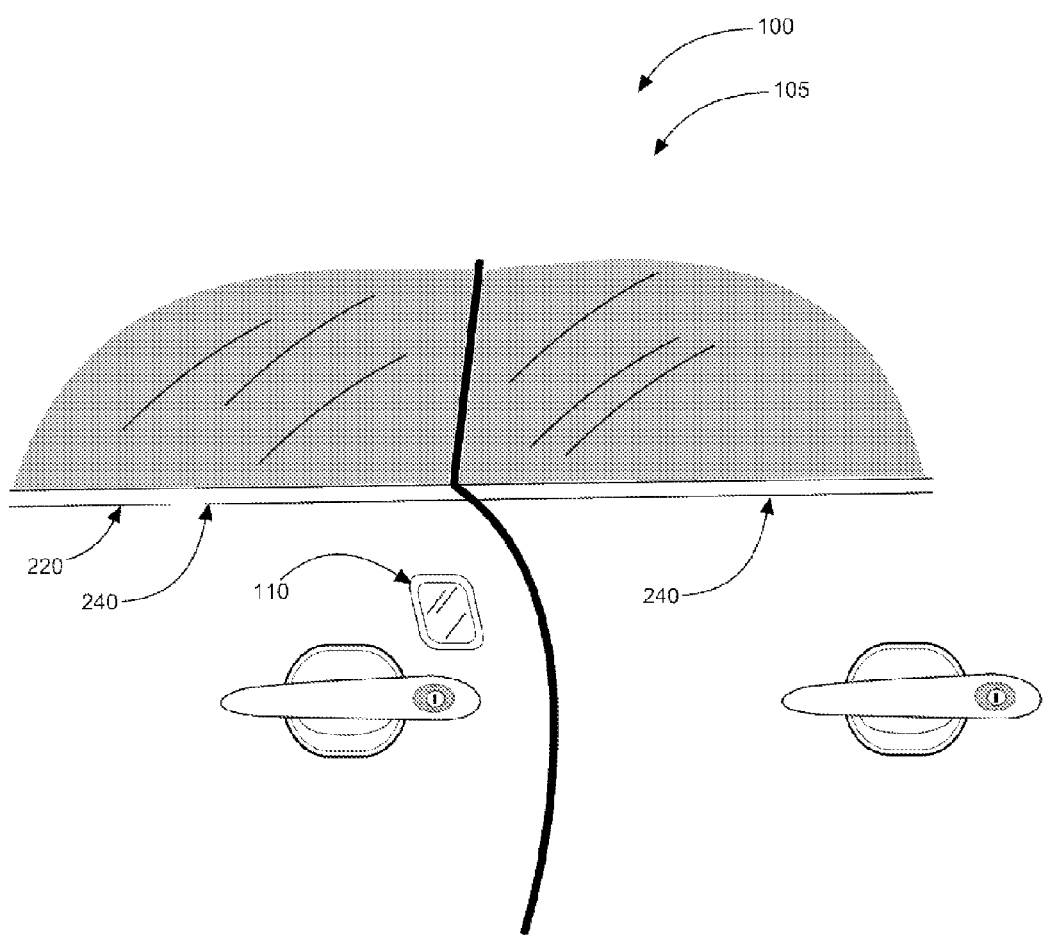
FIG. 2 is a perspective view illustrating a door thumb-pad of the vehicle thumbprint door-lock and ignition access system according to an embodiment of the present invention of FIG. 1.

Referring now to FIG. 2, a perspective view illustrating door thumb-pad 110 of vehicle thumbprint door-lock and ignition access system 100 according to an embodiment of the present invention of FIG. 1.

Thumbprint access assembly 105 is useful for limiting entry into vehicle 220 and the starting motor of vehicle 220 to an authorized user-driver only, and for keylessly unlocking and opening vehicle door(s) 240 for hands-free convenience. Door thumb-pad 110 is in communication with central processing unit 180 such that central processing unit 180 compares an imprinted-thumbprint on the imprinted door thumb-pad 110 with the memory-stored-authorized-thumbprints stored in memory storage device 190 for a match. Memory storage device 190 is preferably located within central processing unit 180, but may be remote in certain embodiments. Central processing unit 180 is in communication with door unlock activation circuit 120 and door opener activation circuit 130 such that door unlock activation circuit 120 unlocks at least one vehicle door 240 and door opener activation circuit 130 opens at least one vehicle door 240 via an electric door opener 140 when central processing unit 180 matches the imprinted-thumbprint with a memory-stored-authorized-thumbprint. Electric door opener 140 may further comprise a 12 volt direct current motor which may be located at each vehicle door 240. Electric door opener 140 disengages when vehicle door 240 reaches a fully opened position and returns to manual operation.

Figure 3:
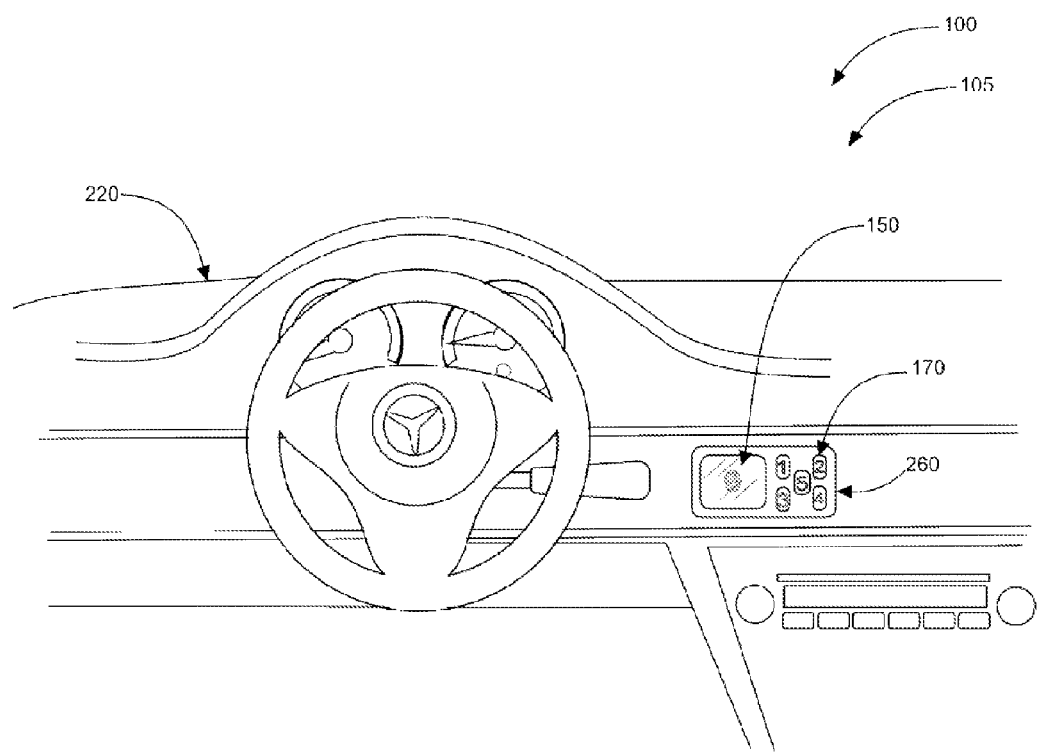
FIG. 3 is a perspective view illustrating an ignition thumb-pad of the vehicle thumbprint door-lock and ignition access system according to an embodiment of the present invention of FIG. 1.

Referring now to FIG. 3, a perspective view illustrating ignition thumb-pad 150 of vehicle thumbprint door-lock and ignition access system 100 according to an embodiment of the present invention of FIG. 1.

Ignition thumb-pad 150 is in communication with central processing unit 180 and ignition-interface-circuit 160 such that vehicle 220 motor is started when central processing unit 180 matches an imprinted-thumbprint with a memory-stored-authorized-thumbprint. Master-door-opener-interface 170 is located on ignition thumb-pad 150 and at least one vehicle door 240 is opened when door button(s) 250 is pressed on master-door-opener-interface 170. A key and a keyed ignition switch are able to be used alternately with ignition thumb-pad 150 and are able to override ignition thumb-pad 150, and a door key and a keyed door-lock are able to be used alternately with door thumb-pads 110 and are able to override door thumb-pads 110. Master-door-opener-interface 170 of ignition thumb-pad 150 is able to selectively unlock and to open a first door, a second door, a third door, and/or a fourth door, or all vehicle doors 240 at once, of vehicle 220. Wireless keychain fob 199 is also able to selectively unlock and to open a first door, a second door, a third door, and/or a fourth door of vehicle 220, or all vehicle doors 240 at once.

Figure 4:
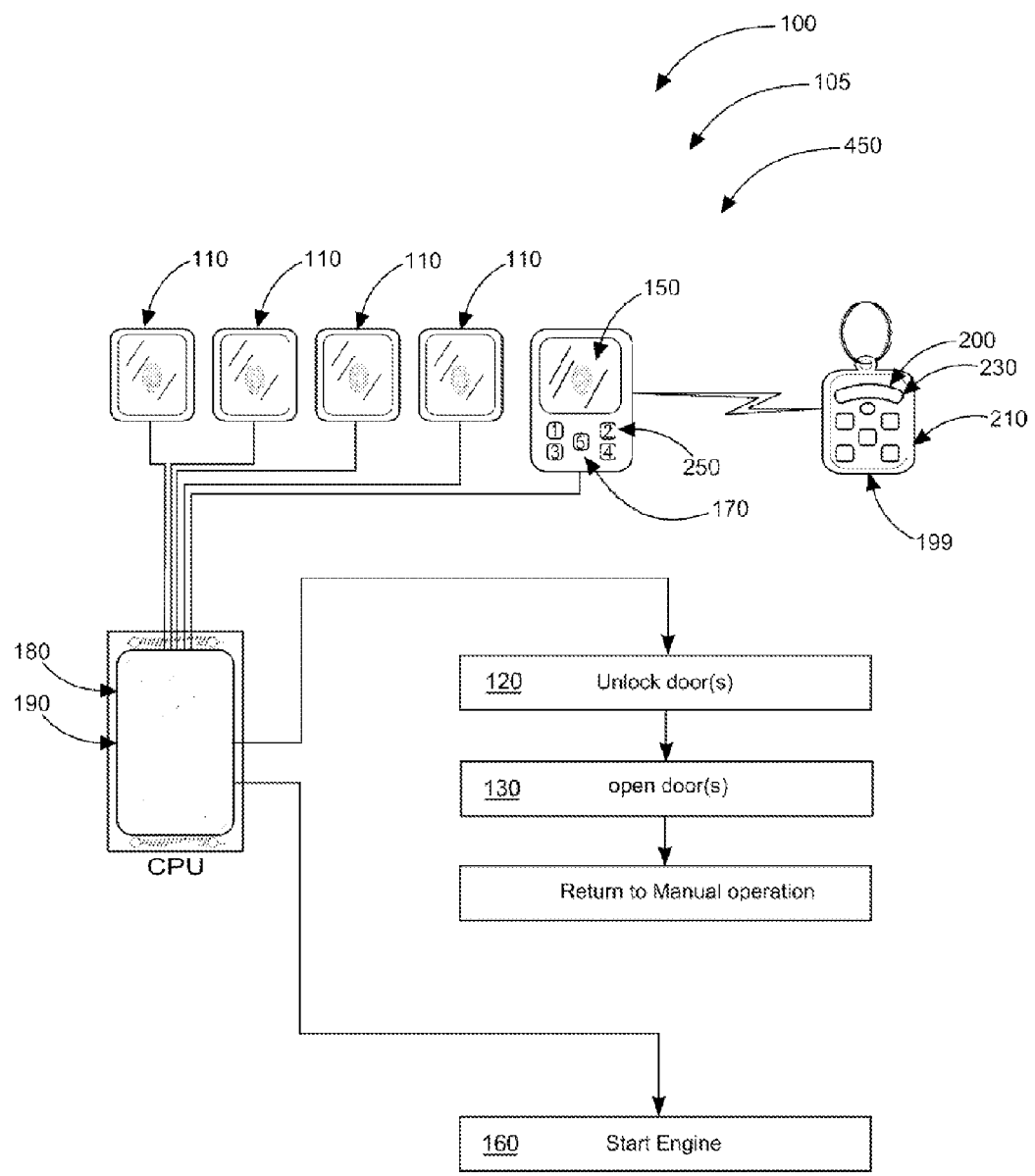
FIG. 4 is a schematic illustrating the vehicle thumbprint door-lock and ignition access system according to an embodiment of the present invention of FIG. 1.

Referring now to FIG. 4, a schematic illustrating vehicle thumbprint door-lock and ignition access system 100 according to an embodiment of the present invention of FIG. 1.

Thumbprint access assembly 105 may have at least one door thumb-pad(s) 110 each with a door unlock activation circuit 120 and door opener activation circuit 130 and electric door opener 140 for each vehicle door 240 having door thumb-pad(s) 110. Ignition thumb-pad 150 may have ignition-interface-circuit 160 and master-door-opener-interface 170. Central processing unit 180 (CPU), having memory storage device 190, processes thumbprint information searching for a true condition, at which time CPU 180 interacts with vehicle 220 existing circuitry to actuate proper response. Wireless keychain fob 199 with ignition-interface-circuit activator 200 and master-door-opener-interface activator 210 is able to remotely operate master-door-opener-interface 170 and ignition-interface-circuit 160 to produce the same functions remotely.

Memory storage device 190 is able to digitally store a plurality of images of memory-stored-authorized-thumbprints. Ignition thumb-pad 150 is a human machine interface 260 (HMI) such that a user-driver is able to remove or add additional memory-stored-authorized-thumbprints into memory storage device 190 using a 5 digit numeric code entered on master-door-opener-interface 170 of ignition thumb-pad 150, and the imprinted-thumbprint of a new user. Door thumb-pad(s) 110 and ignition thumb-pad 150 are preferably optical scanning keypads. Thumbprint access assembly 105 may comprise an analog-to-digital converter for converting an analog image of an imprinted-thumbprint and storing it in digital format. Those with ordinary skill in the art will now appreciate that upon reading this specification and by their understanding the art of fingerprint recognition, memory storage, vehicular ignition systems as described herein, methods of fingerprint recognition for use with automobiles will be understood by those knowledgeable in such art.

Vehicle thumbprint door-lock and ignition access system 100 may be sold as kit 450 comprising the following parts: at least one door thumb-pad(s) 110 with door unlock activation circuit 120 and door opener activation circuit 130; at least one electric door opener 140; at least one ignition thumb-pad 150 having ignition-interface-circuit 160 and master-door-opener-interface 170; at least one central processing unit 180 having memory storage device 190; at least one wireless keychain fob 199 having ignition-interface-circuit activator 200 and master-door-opener-interface activator 210; and at least one set of user instructions. Kit 450 may be retro-fit to existing vehicles. Vehicle thumbprint door-lock and ignition access system 100 may be manufactured and provided for sale in a wide variety of makes and models for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different memory combinations, parts may be sold separately, etc., may be sufficient.

Figure 5:
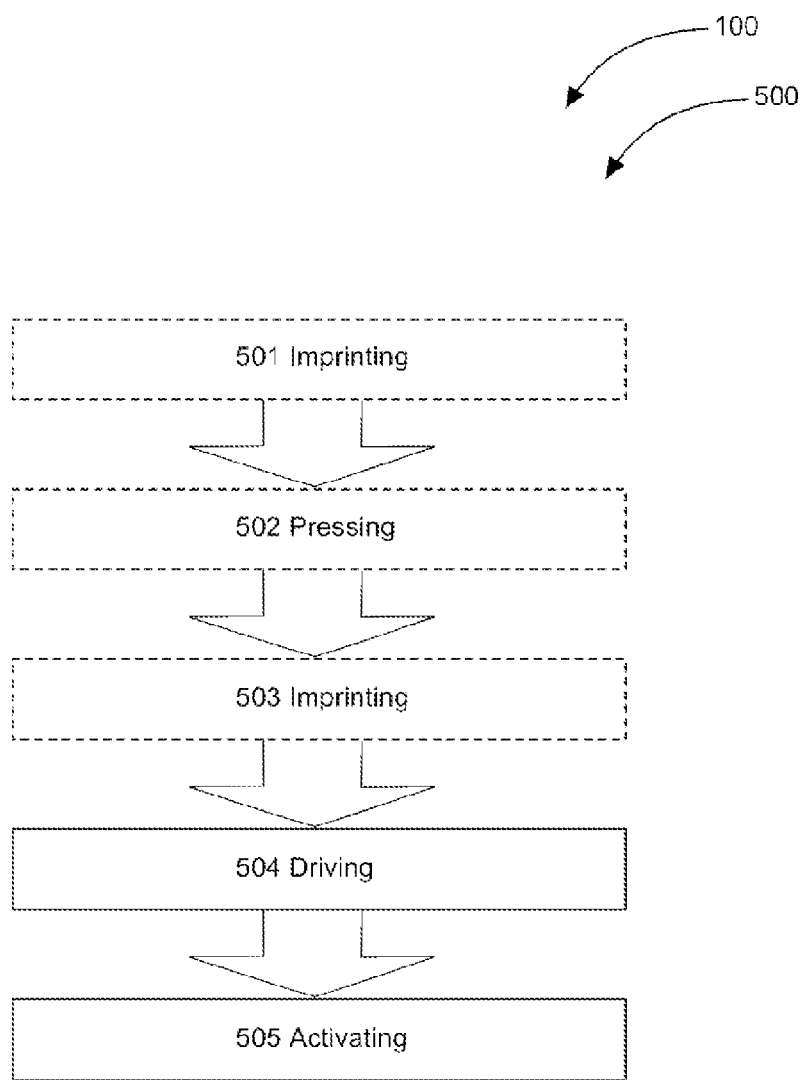
FIG. 5 is a flowchart illustrating a method of use for the vehicle thumbprint door-lock and ignition access system according to an embodiment of the present invention of FIGS. 1-4.

Referring now to FIG. 5, a flow chart illustrating method of use 500 for vehicle thumbprint door-lock and ignition access system 100.

Method of use 500 for vehicle thumbprint door-lock and ignition access system 100 may comprise the steps of: step one 501 imprinting a user-driver thumbprint on door thumb-pad(s) 110 to unlock and to open vehicle door 240; step two 502 pressing at least one door button(s) 250 on master-door-opener-interface 170 on ignition thumb-pad 150 to open at least one additional vehicle door 240; step three 503 imprinting a user-driver thumbprint on ignition thumb-pad 150 to start the engine of vehicle 220; step four 504 driving vehicle 220 from a first location to a second location; and step five 505 activating an engine-shut-off switch to turn off the engine.

It should be noted that steps 501, 502, and 503 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle thumbprint door-lock and ignition access system comprising:
   a thumbprint access assembly having;
      at least one door thumb-pad having;
         a door unlock activation circuit; and
         a door opener activation circuit having an electric door opener;
      an ignition thumb-pad having;
         an ignition-interface-circuit; and
         a master-door-opener-interface;
      a central processing unit having;
         a memory storage device;
      a wireless keychain fob having;
         an ignition-interface-circuit activator; and
         a master-door-opener-interface activator;
   wherein said at least one door thumb-pad is in communication with said central processing unit such that said central processing unit compares an imprinted-thumbprint on said at least one door thumb-pad with at least one memory-stored-authorized-thumbprint within said memory storage device for a match, said memory storage device located within said central processing unit;
   wherein said central processing unit is in communication with said door unlock activation circuit and said door opener activation circuit such that said door unlock activation circuit unlocks at least one vehicle door and said door opener activation circuit opens said at least one vehicle door via said electric door opener when said central processing unit matches said imprinted-thumbprint with said memory-stored-authorized-thumbprint;
   wherein said ignition thumb-pad is in communication with said central processing unit and said ignition-interface-circuit such that a motor of said vehicle is started when said central processing unit matches said imprinted-thumbprint with said memory-stored-authorized-thumbprint;
   wherein said master-door-opener-interface is located on said ignition thumb-pad and wherein said at least one vehicle door is opened when a door-button is pressed on said master-door-opener-interface;
   wherein said ignition-interface-circuit activator is located on said wireless keychain fob and is able to communicate wirelessly with said ignition-interface-circuit such that said engine of said vehicle is started when a start button of said ignition-interface-circuit activator is pressed;
   wherein said master-door-opener-interface activator is located on said wireless keychain fob and is able to communicate wirelessly with said door unlock activation circuit and said master-door-opener-interface such that said at least one said vehicle door is unlocked and is opened when at least one door button of said master-door-opener-interface activator is pressed; and
   wherein said thumbprint access assembly is useful for limiting said vehicle entry and said starting of said motor of said vehicle to an authorized user-driver, and wherein said thumbprint access assembly is useful for keylessly unlocking and opening said vehicle door(s) for safety and convenience.

2. The vehicle thumbprint door-lock and ignition access system of claim 1 wherein a key and a keyed ignition switch is able to be used alternately with said ignition thumb-pad.

3. The vehicle thumbprint door-lock and ignition access system of claim 2 wherein said key and said keyed ignition switch is able to override said ignition thumb-pad.

4. The vehicle thumbprint door-lock and ignition access system of claim 1 wherein a door key and a keyed door-lock is able to be used alternately with said door thumb-pad.

5. The vehicle thumbprint door-lock and ignition access system of claim 1 wherein said door key and said keyed door-lock is able to override said door thumb-pad.

6. The vehicle thumbprint door-lock and ignition access system of claim 1 wherein said master-door-opener-interface of said ignition thumb-pad is able to selectively unlock and to open a first door, a second door, a third door, and a fourth door of said vehicle.

7. The vehicle thumbprint door-lock and ignition access system of claim 6 wherein said wireless keychain fob is able to selectively unlock and to open said first door, said second door, said third door, and said fourth door of said vehicle.

8. The vehicle thumbprint door-lock and ignition access system of claim 1 wherein said memory storage device is able to store a plurality of said images of said memory-stored-authorized-thumbprints.

9. The vehicle thumbprint door-lock and ignition access system of claim 1 wherein said ignition thumb-pad is a human machine interface such that said user-driver is able to add an additional said memory-stored-authorized-thumbprint into said memory storage device using a 5 digit numeric code entered on said master-door-opener-interface of said ignition thumb-pad.

10. The vehicle thumbprint door-lock and ignition access system of claim 1 wherein said at least one door thumb-pad and said ignition thumb-pad are optical scanning keypads.

11. The vehicle thumbprint door-lock and ignition access system of claim 1 wherein said thumbprint access assembly further comprises an analog-to-digital converter for storing said memory-stored-authorized-thumbprint.

12. The vehicle thumbprint door-lock and ignition access system of claim 1 wherein said thumbprint access assembly further comprises a trunk-lid thumb-pad.

13. The vehicle thumbprint door-lock and ignition access system of claim 1 wherein said thumbprint access assembly further comprises an engine-hood thumb-pad.

14. The vehicle thumbprint door-lock and ignition access system of claim 1 wherein said thumbprint access assembly is installed OEM on said vehicle during an initial manufacturing process.

15. The vehicle thumbprint door-lock and ignition access system of claim 1 wherein said thumbprint access assembly is able to be retrofit-installed on said vehicle.

16. The vehicle thumbprint door-lock and ignition access system of claim 1 wherein said electric door opener further comprises a 12 volt direct current motor.

17. The vehicle thumbprint door-lock and ignition access system of claim 1 wherein said electric door opener disengages when said vehicle door reaches a fully opened position.

18. A vehicle thumbprint door-lock and ignition access system comprising:
- a thumbprint access assembly having;
  - at least one door thumb-pad having;
    - a door unlock activation circuit; and
    - a door opener activation circuit having at least one electric door opener;
  - an ignition thumb-pad having;
    - an ignition-interface-circuit; and
    - a master-door-opener-interface;
  - a central processing unit having;
    - a memory storage device;
  - a wireless keychain fob having;
    - an ignition-interface-circuit activator; and
    - a master-door-opener-interface activator;
- wherein said at least one door thumb-pad is in communication with said central processing unit such that said central processing unit compares an imprinted-thumbprint on said at least one door thumb-pad with at least one memory-stored-authorized-thumbprint within said memory storage device for a match, said memory storage device located within said central processing unit;
- wherein said central processing unit is in communication with said door unlock activation circuit and said door opener activation circuit such that said door unlock activation circuit unlocks at least one vehicle door and said door opener activation circuit opens said at least one vehicle door via said at least one electric door opener when said central processing unit matches said imprinted-thumbprint with said memory-stored-authorized-thumbprint;
- wherein said electric door opener further comprises a 12 volt direct current motor;
- wherein said electric door opener disengages when said vehicle door reaches a fully opened position;
- wherein said ignition thumb-pad is in communication with said central processing unit and said ignition-interface-circuit such that a motor of said vehicle is started when said central processing unit matches said imprinted-thumbprint with said memory-stored-authorized-thumbprint;
- wherein said master-door-opener-interface is located on said ignition thumb-pad and wherein said at least one vehicle door is opened when a door-button is pressed on said master-door-opener-interface;
- wherein said ignition-interface-circuit activator is located on said wireless keychain fob and is able to communicate wirelessly with said ignition-interface-circuit such that said engine of said vehicle is started when a start button of said ignition-interface-circuit activator is pressed;
- wherein said master-door-opener-interface activator is located on said wireless keychain fob and is able to communicate wirelessly with said door unlock activation circuit and said master-door-opener-interface such that said at least one said vehicle door is unlocked and is opened when at least one door button of said master-door-opener-interface activator is pressed;
- wherein a key and a keyed ignition switch is able to be used alternately with said ignition thumb-pad;
- wherein said key and said keyed ignition switch is able to override said ignition thumb-pad;
- wherein a door key and a keyed door-lock is able to be used alternately with said door thumb-pad;
- wherein said door key and said keyed door-lock is able to override said door thumb-pad;
- wherein said master-door-opener-interface of said ignition thumb-pad is able to selectively unlock and to open a first door, a second door, a third door, and a fourth door of said vehicle;
- wherein said wireless keychain fob is able to selectively unlock and to open said first door, said second door, said third door, and said fourth door of said vehicle;
- wherein said memory storage device is able to store a plurality of said images of said memory-stored-authorized-thumbprints;
- wherein said ignition thumb-pad is a human machine interface such that said user-driver is able to add an additional said memory-stored-authorized-thumbprint into said memory storage device using a 5 digit numeric code entered on said master-door-opener-interface of said ignition thumb-pad;
- wherein said at least one door thumb-pad and said ignition thumb-pad are optical scanning keypads;
- wherein said thumbprint access assembly further comprises an analog-to-digital converter for storing said memory-stored-authorized-thumbprint;
- wherein said thumbprint access assembly further comprises a trunk-lid thumb-pad;
- wherein said thumbprint access assembly further comprises an engine-hood thumb-pad;
- wherein said thumbprint access assembly is installed OEM on said vehicle during an initial manufacturing process; and
- wherein said thumbprint access assembly is useful for limiting said vehicle entry and said starting of said motor of said vehicle to an authorized user-driver, and wherein said thumbprint access assembly is useful for keylessly unlocking and opening said vehicle door(s) for a hands-free convenience.

19. The vehicle thumbprint door-lock and ignition access system of claim 18 further comprising a kit having:
- said at least one door thumb-pad having said door unlock activation circuit and said door opener activation circuit;

said electric door opener;
said ignition thumb-pad having said ignition-interface-circuit and said master-door-opener-interface;
said central processing unit having said memory storage device;
said wireless keychain fob having said ignition-interface-circuit activator and said master-door-opener-interface activator; and
at least one set of user installation instructions.

\* \* \* \* \*